July 12, 1955

K. I. LUNDGREN 2,712,952

MEANS FOR HOLDING TOGETHER PARTS OF MACHINERY
AND JOINTS, INCLUDING SUCH MEANS

Filed Nov. 21, 1950

2 Sheets-Sheet 1

United States Patent Office 2,712,952
Patented July 12, 1955

2,712,952

MEANS FOR HOLDING TOGETHER PARTS OF MACHINERY AND JOINTS, INCLUDING SUCH MEANS

Karl Ivar Lundgren, Stockholm, Sweden, assignor to Aktiebolaget Atlas Diesel, Nacka, Sweden, a corporation of Sweden Application November 21, 1950, Serial No. 196,752

Claims priority, application Sweden December 8, 1949

8 Claims. (Cl. 287—1)

This invention relates to improvements in means for holding together parts of machinery, for instance parts of a housing of a power driven hand tool, a fan or the like and joints including such means. One object of the invention is to provide a means for holding together parts of machinery without providing said parts with external projections or the like and in such cases in which a screw threaded connection directly between the parts involved is not suitable. A further object of the invention is to provide a means for holding together parts of machinery permitting a reduction of the external diameter and a reduction of the weight of the connected parts of machinery. A still further object of the invention is to provide, for instance, electric motor driven machines with ample and sufficient dimensions on the fan, stator, cooling ducts, etcetera, of the machine and to still maintain a small external diameter. A still further object of the invention is to provide means for connecting parts of machinery disposed in such a way that internal details are easily accessible, and so that external projections or the like for connecting the parts may be dispensed with.

The improved means according to the invention comprises an annular anchoring element having internally disposed means for connecting the parts perpendicularly to the plane of said anchoring element. The invention also includes a connection or joint the parts of which are held together by the improved means according to the invention.

Figure 1:
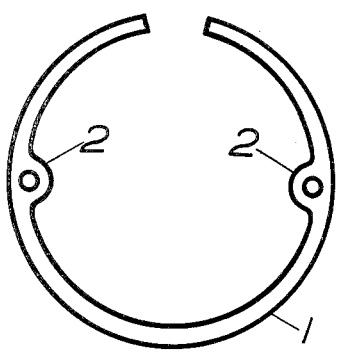
Figure 3:
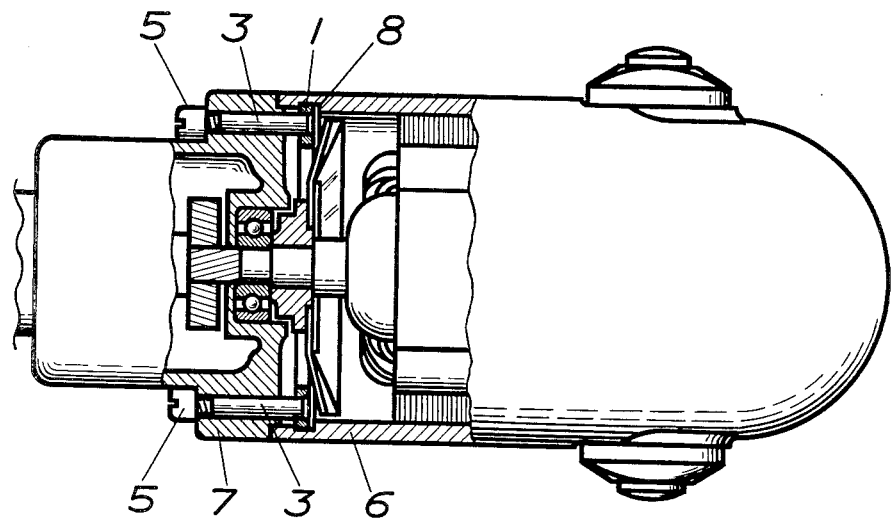
Figure 4:
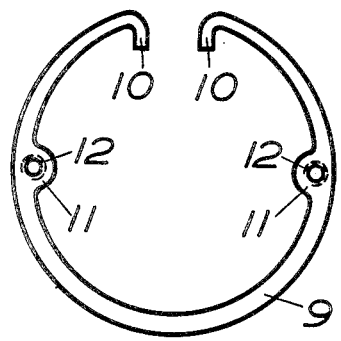
Figure 5:
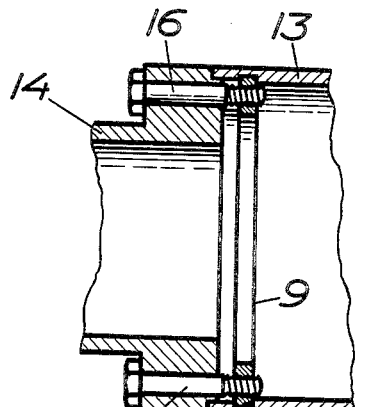
Figure 6:
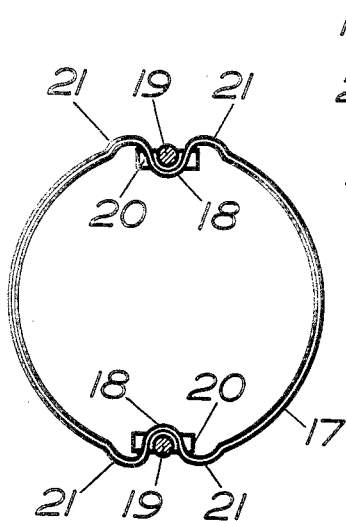
Figures 7, 8:
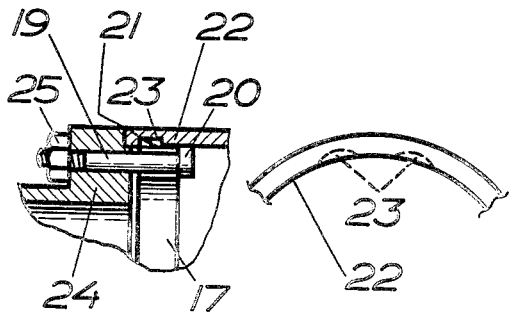

In the accompanying drawings some examples of means embodying the invention and of joints including such means are illustrated by way of example. Fig. 1 is an end view and Fig. 2 a side view of means for holding together parts of machinery according to the invention. Fig. 3 illustrates a portion of an electric motor driven hand tool in which two housings enclosing a motor and a speed reduction gear are held together by the means according to Figs. 1 and 2. Fig. 4 is a plan view of a means for holding together parts of machinery according to a further embodiment of the invention, and Fig. 5 shows a joint the parts of which are held together by such means. Fig. 6 is a plan view of a third embodiment of a means according to the invention, and Fig. 7 illustrates a joint in which said means is incorporated. Fig. 8 is a detail view of a part of Fig. 7.

Figure 2:
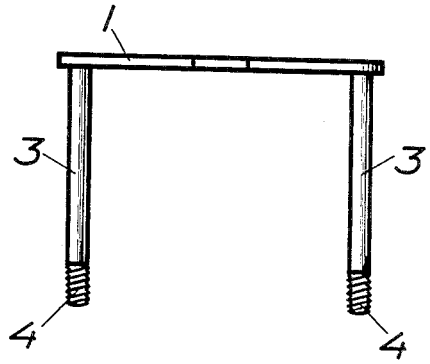

The means according to Figs. 1 and 2 consists of an open or split resilient expansion ring 1, which is provided, for instance, with two lugs 2 projecting radially inwardly and forming seats for screw threaded bolts 3, which may be riveted, welded, screwed or fastened in any other manner into the expansion ring 1. The free ends 4 of the bolts 3 are screw threaded to receive nuts 5, as is obvious from Fig. 3, in which the connecting means according to Figs. 1 and 2 is utilized for holding together a motor housing 6 and a gear housing 7 of an electric hand tool. The cylindrical motor housing 6 is closed at one end and is provided near the other open end with an internal annular groove 8 in which the ring 1 fits. When assembling a machine provided with such a housing the parts of the motor may be assembled from the open end of the housing 6. The connecting means is then fitted in place by compressing the expansion ring 1 slightly with the aid of the bolts 3 and inserting it in the groove 8. The housing 7 may then be fitted on the bolts 3 whereupon the nuts 5 are screwed on the bolts and tightened.

Figs. 4 and 5 show a further embodiment of the invention in which the anchoring element consists of an expansion ring 9, which is resilient and provided with an opening and a pair of inwardly directed fingers 10 which are pulled together when it is desired to compress the ring. The ring is furthermore provided with internally disposed lugs 11 having screw threaded holes therein, as indicated at 12. When two cylindrical machine parts 13 and 14 are connected the ring 9 is fitted in a corresponding internal groove 15 in the part 13 and bolts 16 are inserted through the part 14 and screwed into the threaded holes 12 in the lugs 11 of the ring so that the two parts 13 and 14 are held together.

In the embodiment according to Figs. 6–8 the anchoring means consists of a closed or full sheet metal ring 17 of resilient material provided with inwardly directed bends 18 for receiving bolts 19 with elongated heads 20 formed for preventing turning of the bolts. On both sides of the bends 18 the material of the ring forms projections or lugs 21 which, when the sheet metal ring is assembled into a machine part 22, engage corresponding recesses 23 in the inner wall of the machine part 22 so that the anchoring element is kept steadily therein. The other machine part 24 is then fitted on the bolts 19 and nuts 25 are screwed onto the bolts so that a joint is obtained as is obvious from Fig. 7.

The means for holding together the machine parts, above described and illustrated in the drawings, should be considered only as examples and may be modified in several different ways falling within the scope of the following claims. Instead of screw threaded joints, wedges, or locking rings, other similar connecting means may be employed.

What I claim is:

1. Means for holding a first machine part having a cavity defined by an inner wall provided with abutment means to a second machine part, said first mentioned means comprising an annular resilient anchoring ring having a gap and capable of being compressed in the plane of said ring for insertion into said cavity to engage said abutment means, two diametrically disposed bolts fixed at one end to said anchoring ring, said bolts being located symmetrically one on each side of said gap and extending perpendicularly to the plane of the ring, and removable means engaging said bolts at the other ends thereof and engageable with said second part for holding said parts together.

2. Means for holding a first machine part having a cavity defined by an inner wall provided with abutment means to a second machine part, said first mentioned means comprising an annular anchoring element capable of being resiliently compressed in the plane of the element for insertion past said abutment means and subsequently expanded to engage said abutment means to retain the element against displacement from the cavity, and tension bolts engaging portions of the anchoring element and extending perpendicularly to the plane thereof and adapted to engage said second part to hold said parts together.

3. A joint comprising a hollow machine part having a cavity defined by an inner wall providing internal abutment means, a second machine part, and an annular anchoring element capable of being resiliently compressed in the plane of the element for insertion past said abutment means and subsequently expanded to engage said abutment means to retain the element against displacement from the cavity, and tension bolts engaging portions of the anchoring element and extending perpendicularly to the plane thereof and adapted to engage said second part to hold said parts together.

4. A joint comprising a hollow machine part having a cavity defined by a substantially cylindrical wall and having a smooth substantially cylindrical exterior surface at least at one end portion of the part, a second machine part adapted to be fitted endwise of said hollow machine part and having an external form at the abutting portion substantially conforming with the exterior surface of said hollow machine part, internal abutment means formed in said cylindrical wall, an annular anchoring element capable of being resiliently compressed in the plane of the element for insertion past said abutment means and subsequently expanded to engage said abutment means to retain the element against displacement from the cavity, tension bolts engaging portions of the anchoring element and extending perpendicularly to the plane thereof, and means in said second machine part engageable by said tension bolts, whereby tightening of the bolts operates to bring said anchoring element into pressure engagement with said abutment means and to bring said parts into pressure engagement with each other in the direction of the length of said bolts.

5. Means for holding a first machine part having a cavity defined by an inner wall provided with abutment means to a second part, said first mentioned means comprising an annular anchoring ring capable of being resiliently compressed in the plane of the ring for insertion into said cavity inwardly of said abutment means and subsequently expanded to engage said abutment means to retain said ring against displacement from said cavity, a plurality of elongated members in engagement at one end with said anchoring ring, said members extending substantially perpendicular to the plane of said ring and means adjacent the opposite ends of said members for engaging said second machine part to retain the same against axial movement relative to said first part.

6. A device as defined in claim 5, in which said annular anchoring ring is provided with inwardly extending lugs, screw threaded apertures in said lugs substantially perpendicular to the plane of said ring and said elongated members comprising bolts engaging said second part and threadedly received in said apertures for holding said parts together.

7. A device as defined in claim 5, in which said annular anchoring ring is provided with a plurality of inwardly and outwardly extending bent portions, said outwardly extending portions providing lugs for engaging said abutment means, said elongated members having means at one end engaging said inwardly extending portions and extending substantially perpendicular to the plane of said ring and means adjacent the opposite ends of said members engaging said second part to hold said parts together.

8. A device as defined in claim 5 in which said annular anchoring ring is provided with two diametrically disposed, inwardly extending lugs, a gap in said ring, fingers on said ring extending inwardly at opposite sides of said gap, said lugs being disposed symmetrically one on each side of said gap, screw threaded apertures in said lugs substantially perpendicular to the plane of said ring and said elongated members comprising bolts engaging said second part and threadedly received in said apertures for holding said parts together.

References Cited in the file of this patent

UNITED STATES PATENTS

| Number | Name | Date |
| --- | --- | --- |
| 442,758 | Soden | Dec. 16, 1890 |
| 629,872 | Robson | Aug. 1, 1899 |
| 1,048,983 | Madden | Dec. 31, 1912 |
| 1,203,071 | Straub | Oct. 31, 1916 |
| 1,220,987 | Henry | Mar. 27, 1917 |
| 1,286,320 | Hood | Dec. 3, 1918 |
| 1,289,867 | Moore | Dec. 31, 1918 |
| 1,402,452 | Simpson | Jan. 3, 1922 |
| 1,479,193 | McSpadden | Jan. 1, 1924 |
| 2,425,128 | Schmidt | Aug. 5, 1947 |
| 2,513,734 | Nardone | July 4, 1950 |
| 2,549,357 | Angelone | Apr. 17, 1951 |
| 2,578,094 | Sears | Dec. 11, 1951 |